July 16, 1963 — E. G. VALLIERE — 3,097,418
ELECTRICALLY CODED TERRAIN MODEL MAP
Filed Nov. 20, 1958
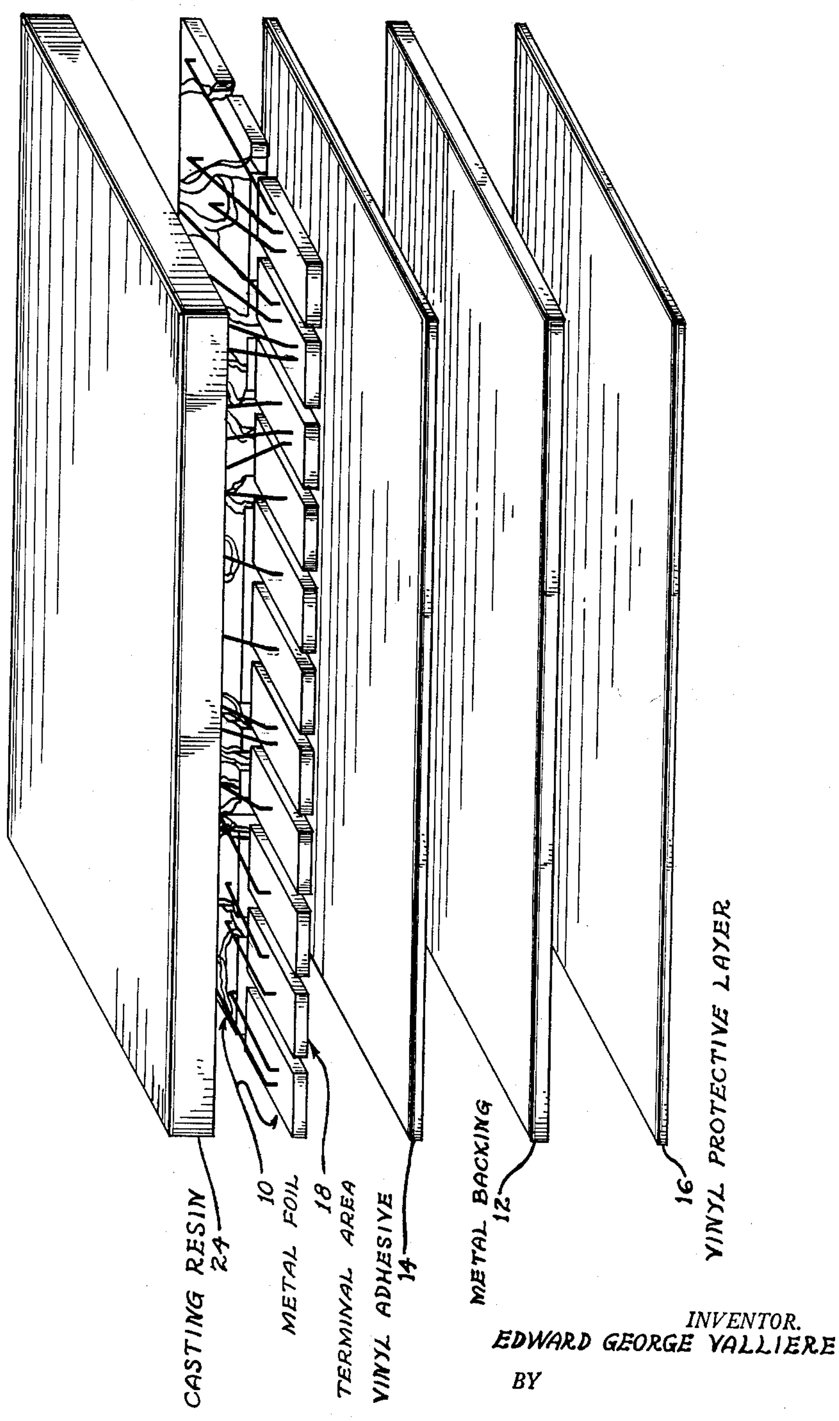
INVENTOR.
EDWARD GEORGE VALLIERE
BY
Laurence S. Epstein
ATTORNEYS United States Patent Office 3,097,418
Patented July 16, 1963

3,097,418
ELECTRICALLY CODED TERRAIN MODEL MAP

Edward G. Vailliere, Elkins Park, Pa., assignor, by mesne assignments, to the United States of America as represented by the Secretary of the Navy Filed Nov. 20, 1958, Ser. No. 775,331
3 Claims. (Cl. 29—155.5)

This invention relates generally to map making equipment and more specifically to a method of fabricating an electrically coded metal foil contour map.

This invention, while generally applicable, is preferably utilized in conjunction with the system disclosed in patent application Serial No. 774,791, filed November 18, 1958, now abandoned, and the elements which are the subjects of patent applications Serial Numbers 775,317, filed November 20, 1958, now Patent No. 3,018,439; 775,328, filed November 20, 1958, now abandoned; 766,650, filed November 26, 1958; now Patent No. 2,981,123; 776,652, filed November 26, 1958, now Patent No. 2,991,663; 778,271, filed December 4, 1958, now Patent No. 3,040,306, and Patent No. 2,876,562.

An object of the invention therefore is to provide a method of fabricating an electrically coded metal foil contour map.

Another object of the invention is to provide a method of making an accurate, low cost electrically coded metal foil contour map.

Other objects and many of the attendant advantages of this invention will be readily appreciated as the same becomes better understood by reference to the following detailed description when considered in connection with the accompanying drawings wherein:

The FIGURE depicts in exploded form the physical arrangement of the map elements together with elements used in the fabricating of the map.

In the method of making an electrically coded metal foil contour map, a metal foil capacle of conducting electricity is necessary. In addition to being a good electrical conductor, the metal foil must also be receptive to soldering or spot welding as well as being easily photo-etched. In this regard, a copper foil is preferable and can be tin plated after etching to aid in soldering and in preventing oxidation. To the metal foil 10, a metal backing 12 is bonded by means of a thick polyvinyl varnish 14. With regard to these elements, the metal backing 12 must be thin and the thick polyvinyl varnish 14 must be electrically and chemically stable, and in addition it must be peelable. The metal backing 12 is then coated with a vinyl protective layer 16 on its underside.

A contour map positive reverse, i.e. a mirror image, is then photo-etched into the metal foil 10. In the preferred form of the invention, a series of rectangular terminal areas 18 are also photo-etched on the metal foil. The contour map photo-etched into the metal foil 10 is then tinned by chemical deposition. At this point in the preparation of the contour map it is desirable to examine the quality of the etching. Where there are doubtful contour lines, i.e. an area is not electrically isolated from its adjacent area, it is suggested that a capacitor be discharged across doubtful contour line. Such discharge current will blast the partially etched places in the line. Next, the border terminal areas 18 are assigned elevation values and each map area or portion is connected by a wire to its particular elevation terminal or to an adjacent area of the same elevation.

After all connections have been made and checked, a casting resin 24 is poured over the etched contour map to a depth sufficient to cover and protect the inter-connecting wires. When the resin 24 has hardened, the metal backing sheet is peeled away from the resin casted map to expose the map.

In operation the metal backing operates to aid in keeping the segmentary map contour areas in their respective relative positions and the vinyl adhesive 14 acts to bind the metal foil 10 to the metal backing 12 and prevent etching of the metal backing 12 from above. The vinyl protective layer 16 operates to prevent etching of the metal backing 12 from its underside.

Obviously many modifications and variations of the present invention are possible in the light of the above teachings. It is therefore to be understood that within the scope of the appended claims the invention may be practiced otherwise than as specifically described.

I claim:

1. The method of fabricating an electrically coded contour map comprising the steps of bonding by means of vinyl adhesive a photo-sensitive metal foil to a thin backing, photo-etching a contour map into said metal foil, said contour map having elevation contour areas electrically connecting same elevation contour areas together, casting said electrical connections in a casting resin, and peeling said backing and said vinyl adhesive away from the contour map.

2. The method of fabricating an electrically coded contour map comprising the steps of bonding by means of a vinyl adhesive a thin metal backing to a photo-sensitive copper foil, coating the exposed side of said metal backing with a vinyl protective layer, photo-etching into said copper foil a positive reversed contour map and a series of border areas, tin plating said photo-etched copper foil, assigning elevation values to said series of border areas and electrically connecting by soldering all like elevation areas to its respective border area, casting the side of said contour map having said electrical connections thereon in a casting resin, and peeling said metal backing with its vinyl protective layer thereon and said vinyl adhesive away from said contour map.

3. The method of claim 2 including the discharging of a capacitor across adjacent contour segments to aid in isolating the segments from each other.

References Cited in the file of this patent

UNITED STATES PATENTS

| | | |
|---|---|---|
| 2,399,753 | McLarn | May 7, 1946 |
| 2,692,190 | Pritikin | Oct. 19, 1954 |
| 2,699,424 | Nieter | Jan. 11, 1955 |
| 2,703,772 | Keithly | Mar. 8, 1955 |
| 2,743,629 | Pellegrino et al. | May 1, 1956 |
| 2,762,113 | Daniels et al | Sept. 11, 1956 |
| 2,876,530 | Howatt | Mar. 10, 1959 |
| 2,876,562 | Stieber | Mar. 10, 1959 |
| 2,877,544 | Gammel | Mar. 17, 1959 |
| 2,902,629 | Little et al. | Sept. 1, 1959 |
| 2,927,251 | Jones et al. | Mar. 1, 1960 |

OTHER REFERENCES

"Printed-Wiring Multiple Soldering Methods," by A. E. Stones, Tele-Tech & Electronic Industries, page 62, 3rd paragraph, December 1953.